Nov. 16, 1926.  
J. E. HODSON  
1,607,080  
DEVICE FOR RAISING AND LOWERING WINDOWS  
Filed Nov. 28, 1924
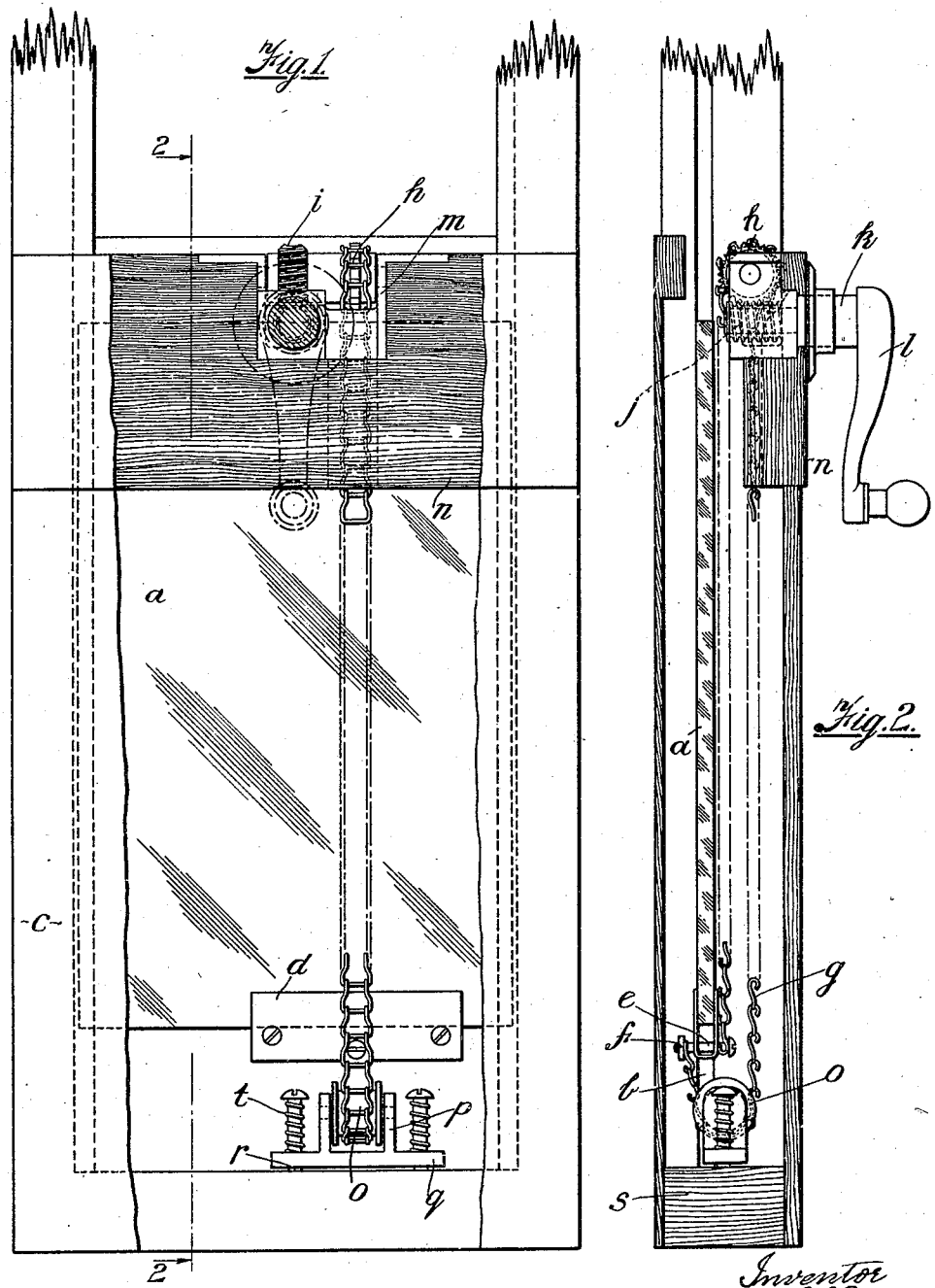

Patented Nov. 16, 1926.

1,607,080

UNITED STATES PATENT OFFICE.

JAMES ERNEST HODSON, OF CHESTER, ENGLAND, ASSIGNOR TO FREDERICK WILLIAM BERWICK, OF CHELSEA, ENGLAND.

DEVICE FOR RAISING AND LOWERING WINDOWS.

Application filed November 28, 1924. Serial No. 752,715, and in Great Britain December 21, 1923.

This invention relates to means for raising and lowering windows and has particular although not exclusive reference to the means employed for raising and lowering the windows of automobile and other road vehicles.

The object of the invention is to provide an improved and simplified construction of window raising and lowering means whereby the window may be adjusted to any desired position and thereafter maintained automatically in such position until the necessity arises for further adjustment.

According to the invention means for raising and lowering windows are provided wherein a manually operated rotary device is directly connected by flexible means to a window in such a manner that the window will remain in any position to which it is adjusted. The flexible means preferably comprises a belt or chain having means to maintain it under constant tension and attached to the lower portion of the window so that movement of the rotary operating device is communicated directly to the window to raise or lower the same in accordance with the direction of rotation.

Reference will now be made to the accompanying drawings which illustrate by way of example a construction according to the invention and in which:—

Figure 1 is a front elevation partly in section, and

Figure 2 is a cross sectional elevation on the line 2—2 of Figure 1.

In the drawings, $a$ indicates a window pane which is slidably mounted in grooves $b$ formed in a framework $c$ which may be part of the door or body of an automobile vehicle. The lower edge of the window $a$ has secured thereto a clip $d$ which may be cemented in place or secured as shown by studs $e$ and nuts $f$. The ends of a chain $g$ are also attached to the clip $d$ or an endless chain may be employed secured at one point to the clip $d$. The upper stretch of the chain $g$ passes around a sprocket wheel $h$ mounted coaxially with a worm wheel $i$ meshing with a worm $j$ mounted or formed upon the spindle $k$ of an operating handle $l$. The sprocket wheel $h$, worm wheel $i$ and worm $j$ are mounted in bearings formed in a housing $m$ carried in a transverse member $n$ of the framework $c$. The lower stretch of the chain $g$ passes around a roller $o$ mounted in bearings $p$ formed integral with or secured to a base plate $q$ which is slotted to pass over a pair of studs $r$ projecting upwardly from the base member $s$ of the framework $c$. Between the heads of the studs $k$ and the upper surface of the base plate $q$ are disposed coiled springs $t$ the tendency of which is to urge the plate $q$ and the roller $o$ in the downward direction.

In the operation of the device above described, the effect of the springs $t$ is to maintain the chain $g$ always under tension so that any movement imparted to the operating handle $l$ is communicated directly to the window $a$ which will move upwards or downwards according to the direction of rotation imparted to the said operating handle whilst, owing to the interposition of the worm wheel $i$ and worm $j$ in the operating connections the window $a$ cannot slip downwards from any position to which it is adjusted as would otherwise be the case were the window susceptible to the vibration of the vehicle.

The invention is not limited to the exact details of construction above described as an endless belt may be substituted for the chain $g$ and instead of the worm and worm wheel a pair of mitre wheels may be employed. In this latter construction, however, it is necessary to employ a check action to prevent the window slipping down from a desired position of adjustment, and thus the check action may consist in a spring pressed plunger or ball adapted to engage in any one of a series of recesses formed around the periphery of the spindle $k$ of the operating handle. Alternatively the worm wheel may have coaxially mounted therewith a friction disc both being slidable and normally held apart by a resilient device. Friction faces formed on the wheel and disc are adapted to engage with fixed members to overcome the effects of handle weight and vibration but being relieved automatically when the handle is rotated to raise the window.

I claim:—

The combination, with a window frame provided with a base member which extends across its bottom, said frame having also a transverse member secured above the base member and projecting part-way over it, and a window pane slidable in the said frame over the base member and to one side of the transverse member; of means for sliding the window pane, comprising a driving wheel and self-sustaining operating mechanism therefor mounted directly on the said transverse member, a spring-pressed wheel attached directly below the lower edge of said window pane and to the said base member, and a driving chain passing over the two driving wheels and its ends attached to the lower edge of said window pane, said driving wheels having their axes arranged parallel to each other and to the face of the window pane.

In witness whereof I affix my signature.

JAMES ERNEST HODSON.